Patented Jan. 5, 1937

2,067,138

UNITED STATES PATENT OFFICE 2,067,138

NUCLEAR SUBSTITUTED ACENAPHTHALIC ACIDS AND 1,4,5,8-NAPHTHALENETETRA-CARBOXYLIC ACIDS AND PROCESS OF PREPARING THEM

Wilhelm Eckert and Ernst Fischer, Frankfort-on-the-Main-Hochst, Germany, assignors to General Aniline Works, Inc., New York, N. Y., a Corporation of Delaware No Drawing. Application March 1, 1933, Serial No. 659,238. In Germany March 2, 1932

7 Claims. (Cl. 260—108)

The present invention relates to nuclear substituted acenaphthalic acids and 1,4,5,8-naphthalenetetracarboxylic acids and a process of preparing them.

We have found that nuclear substituted acenaphthalic acids and 1,4,5,8-naphthalenetetracarboxylic acids are easily obtainable by sulfonating, nitrating or halogenating acenaphthalic acid according to one of the known methods and, if required, subjecting the products thus obtained to further transformation reactions or to an oxidation with formation of tetracarboxylic acids or also to both of these operations in any desired order. Thus, for instance, acenaphthalic acid may be sulfonated to a uniform product and the 3-sulfoacenaphthalic acid obtained may be oxidized to 2-sulfo-1,4,5,8-naphthalenetetracarboxylic acid. By treating the latter in the melt with alkalies, it may be converted into 2-hydroxynaphthalenetetracarboxylic acid which, on alkylation, forms the corresponding alkoxy derivatives.

Furthermore, by melting 3-sulfoacenaphthalic acid with alkalies, it may be transformed into 3-hydroxyacenaphthalic acid which, on oxidation, likewise yields 2-hydroxynaphthalenetetracarboxylic acid.

The acenaphthalic acid may be nitrated, whereby, under certain conditions, the nitroacenaphthalic acid formed is directly oxidized to nitronaphthalenetetracarboxylic acid which may be reduced and transformed according to Sandmeyer's reaction into the corresponding halogen-, hydroxy- or like derivatives.

It is very surprising that these reactions are operative because carbon dioxide is split off comparatively easily from acenaphthalic acid as well as naphthalenetetracarboxylic acid. Thus, for instance, even the transformation of the free naphthalenetetracarboxylic acid into its dianhydride must be performed with great care (cf. Bamberger & Philip: Liebig's Annalen, volume 240, pages 182 et seq.).

According to the process of the present invention a great number of new substances are obtainable, for instance, those of the following formula:

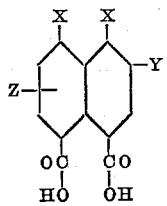

wherein X means the carboxylic acid group or the two X's jointly represent the bivalent group —CH₂—CH₂—, forming thus part of a five-membered ring, wherein Y represents a substituent of the group consisting of sulfonic acid, hydroxy, alkoxy, nitro and amino and wherein Z means a nitro or amino group in case Y represents a nitro or amino group, respectively or Z otherwise means hydrogen.

From the carboxylic acids there may easily be prepared the corresponding anhydrides and vice versa. The anhydrides are to be considered as equivalents and as comprised in the present invention.

The following examples serve to illustrate the invention but they are not intended to limit it thereto, the parts being by weight unless otherwise stated:

(1) 10 parts of pulverized acenaphthalic acid are gradually introduced, while stirring, into 40 parts by volume of fuming sulfuric acid of 20% SO₃ at a temperature which must not exceed 25° C. When a test portion taken from the mixture entirely dissolves in water, the sulfonation is interrupted, the reaction mixture is poured on ice and the sulfonation product is separated by addition of potassium chloride. The potassium salt of the mono-sulfoacenaphthalic acid anhydride of the following probable constitution:

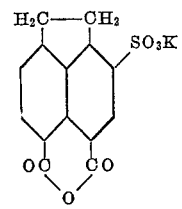

is filtered with suction, washed until neutral with a solution of potassium chloride and dried. It forms a colorless product which dissolves in water to a solution having a deep blue fluorescence.

34 parts of the potassium salt of mono-sulfoacenaphthalic acid thus formed are dissolved in 10 times their weight of dilute caustic soda solution and about 53 parts of potassium permanganate dissolved in water are run thereinto at 80° C.–90° C. When the oxidation is finished, the excess of potassium permanganate is destroyed in the usual manner, filtered with suction from the precipitated pyrolusite and the filtrate which has been concentrated to a small volume is acidified with concentrated hydrochloric acid. The precipitated mono-sulfo-1,4,5,8-naphthalenetetracarboxylic acid or its dianhydride, respectively, which may be supposed to have the following constitutional formulae:

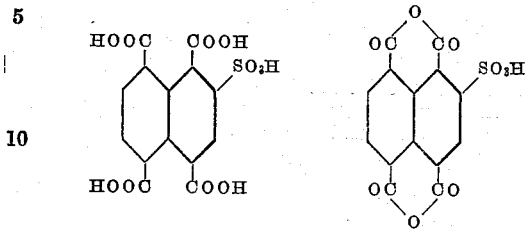

is filtered with suction, washed until neutral with a sodium chloride or a potassium chloride solution and dried; it crystallizes from water in the form of fine colorless needles.

(2) 10 parts of the mono-sulfo-1,4,5,8-naphthalenetetracarboxylic acid obtainable according to Example 1 are slowly introduced at about 100° C. into 100 parts of molten caustic potash, the temperature of the melt is gradually raised to 140° C. and this temperature is maintained for about half an hour. After cooling, the melt is introduced into water and acidified with dilute mineral acids. The mono-hydroxy-1,4,5,8-naphthalenetetracarboxylic acid which has been precipitated and which has the following constitution:

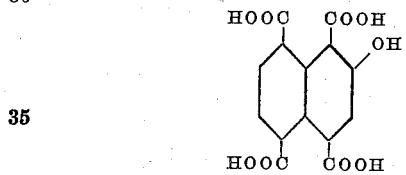

is filtered off, washed until neutral and dried. By recrystallizing it from glacial acetic acid or acetic acid anhydride it precipitates, probably in the form of its dianhydride, in yellow crystals.

(3) 50 parts of the mono-sulfo-acenaphthalic acid obtained as intermediate product in Example 1 are introduced into 400 parts of molten caustic potash and the whole is slowly heated to about 130° C.–140° C. When the reaction is finished, the cooled mass is introduced into water and, without isolating the mono-hydroxyacenaphthalic acid, a 10% potassium permanganate solutions is run into the alkaline solution at about 90° C. until the violet red color of the said permanganate solution no longer disappears. The pyrolusite formed is filtered off. On acidification with mineral acids, there precipitates from the filtrate the mono-hydroxy-1,4,5,8-naphthalenetetracarboxylic acid which is identical to that described in Example 2.

(4) 10 parts of acenaphthalic acid are dissolved in 100 parts by volume of concentrated sulfuric acid and at a temperature between 15° C. and 20° C., 16 parts by volume of concentrated nitric acid (specific gravity 1.52) are added thereto. The nitration mixture is poured after a short time on ice, the product which has been precipitated is filtered with suction, washed until neutral and dried. On recrystallization, for instance from glacial acetic acid, there is obtained a difficultly soluble product in the form of yellow prisms, which is the anhydride of dinitroacenaphthalic acid. By means of water there is precipitated from the glacial acetic acid mother lye an acid which crystallizes from chlorobenzene in nearly colorless prisms; it is a dinitro-1,4,5,8-naphthalenetetracarboxylic acid. From the nitro compounds there may be obtained by reduction according to known methods the corresponding amino compounds.

(5) By treating the alkaline solution of the hydroxy-carboxylic acids obtainable according to Examples 2 and 3 with diethylsulfate or another alkylating agent, the corresponding alkoxy-carboxylic acids are obtained.

(6) 50 parts af acenaphthalic acid, 100 parts by volume of phosphorus oxychloride, 100 parts by volume of sulfuryl chloride and 2 parts of phosphorus pentachloride are heated at 60° C. for about 10 hours while stirring. Towards the end of the chlorination a small quantity of chloroform is added in order to facilitate stirring. After cooling, the product is filtered with suction. The monochloracenaphthalic acid obtained crystallizes from glacial acetic acid in the form of colorless needles melting at 208° C.–210° C. 10 parts of recrystallized chloracenaphthalic acid are dissolved in glacial acetic acid and about 15 parts of chromic acid anhydride are gradually added thereto. The yellow product which precipitates on addition of water is dissolved in boiling acetic acid anhydride. On cooling, the anhydride of monochloronaphthalene-1,4,5,8-tetracarboxylic acid crystallizes in the form of faintly yellow prisms melting above 300° C.

We claim:

1. The process which comprises introducing according to known methods into acenaphthalic acid a substituent of the group consisting of sulfonic acid, nitro and halogen and oxidizing the substitution products thus obtained to the corresponding naphthalene tetracarboxylic acid derivatives.

2. The process which comprises treating at a temperature of between 15° C. and 20° C. acenaphthalic acid dissolved in concentrated sulfuric acid with concentrated nitric acid.

3. The process which comprises treating at a temperature of about 60° C. for about 10 hours acenaphthalic acid with a mixture of phosphorus oxychloride, sulfuryl chloride and a small portion of phosphorus pentachloride and oxidizing the chlorination product thus obtained after dissolving in glacial acetic acid with chromic acid anhydride.

4. The compounds of the following general formula:

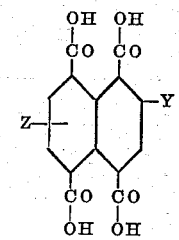

wherein Y represents a substituent of the group consisting of sulfonic acid, hydroxy and nitro and wherein Z means a nitro group in case Y represents a nitro group, or Z otherwise means hydrogen.

5. The compound of the following formula:

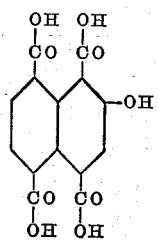

which compound precipitates, on recrystallization from glacial acetic acid or acetic acid anhydride in the form of yellow crystals.

6. The compound of the following formula:

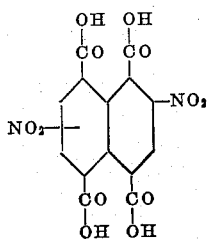

which compound crystallizes from chlorobenzene in nearly colorless prisms.

7. The process which comprises treating at room temperature pulverized acenaphthalic acid with oleum of 20 percent $SO_3$. oxidizing the water-soluble product thus obtained by means of an alkaline solution of potassium permanganate and melting the mono-sulfo-1,4,5,8-naphthalene tetracarboxylic acid thus obtained at about 140° C. with caustic potash.

WILHELM ECKERT.
ERNST FISCHER.